(12) United States Patent
Blasco Claret et al.

(10) Patent No.: US 8,699,597 B2
(45) Date of Patent: Apr. 15, 2014

(54) METHOD FOR THE SPECTRAL CONFIGURATION OF SIGNALS MODULATED BY MEANS OF ORTHOGONAL FREQUENCY DIVISION MULTIPLEXING (OFDM) FOR AN ELECTRICAL NETWORK

(75) Inventors: Jorge Vicente Blasco Claret, Valencia (ES); Juan Carlos Riveiro Insua, Valencia (ES); Salvador Iranzo Molinero, Valencia (IT); Jose Abad Molina, Velez (ES)

(73) Assignee: Marvell Hispania, S.L.U., Madrid (ES)

( * ) Notice: Subject to any disclaimer, the term of this patent is extended or adjusted under 35 U.S.C. 154(b) by 25 days.

(21) Appl. No.: 13/608,226

(22) Filed: Sep. 10, 2012

(65) Prior Publication Data

US 2013/0003790 A1    Jan. 3, 2013

Related U.S. Application Data

(63) Continuation of application No. 11/264,621, filed on Nov. 1, 2005, now Pat. No. 8,265,176, which is a continuation of application No. PCT/ES2004/000173, filed on Apr. 22, 2004.

(30) Foreign Application Priority Data

May 6, 2003    (ES) .................................. 200301022

(51) Int. Cl.
*H04K 1/10*    (2006.01)
(52) U.S. Cl.
USPC .......................................... 375/260; 370/464
(58) Field of Classification Search
USPC .......... 375/260, 295; 370/210, 465, 464, 466, 370/467, 468, 480, 208; 455/404, 405
See application file for complete search history.

(56) References Cited

U.S. PATENT DOCUMENTS

| | | | |
|---|---|---|---|
| 5,790,516 A | 8/1998 | Gudmundson et al. | |
| 6,175,550 B1 | 1/2001 | Van Nee | |
| 6,421,396 B1 | 7/2002 | Hawley et al. | |
| 6,484,029 B2 * | 11/2002 | Hughes et al. | 455/434 |
| 6,563,862 B1 | 5/2003 | Knutson et al. | |
| 7,260,395 B1 * | 8/2007 | Hughes et al. | 455/432.2 |
| 7,295,626 B2 | 11/2007 | Chayat | |
| 2002/0105901 A1 | 8/2002 | Chin et al. | |
| 2003/0235147 A1 | 12/2003 | Walton et al. | |
| 2004/0028003 A1 * | 2/2004 | Diener et al. | 370/319 |

(Continued)

FOREIGN PATENT DOCUMENTS

| WO | WO/01/76110 | 10/2001 |
|---|---|---|
| WO | WO/02/37706 | 5/2002 |

*Primary Examiner* — Aristocratis Fotakis

(57) ABSTRACT

A transceiver includes a transmitter and a receiver. The transmitter receives a first orthogonal frequency division multiplexing (OFDM) signal, and generates a first analog signal based on the first OFDM signal. The first OFDM signal has a first bandwidth, a first spectral position, and a first frequency spectrum. The first frequency spectrum of the first OFDM signal has a first set of frequencies with first amplitudes. The receiver receives a second analog signal, and generates a second OFDM signal based on the second analog signal. The second OFDM signal has a second bandwidth, a second spectral position, and a second frequency spectrum. The second frequency spectrum of the second OFDM signal has a second set of frequencies with second amplitudes. The transmitter varies the first bandwidth, the first spectral position, and the first amplitudes independent of the second bandwidth, the second spectral position, and the second amplitudes.

19 Claims, 3 Drawing Sheets

(56) References Cited

U.S. PATENT DOCUMENTS

| | | |
|---|---|---|
| 2004/0117764 A1* | 6/2004 | Sinha et al. .................. 717/110 |
| 2004/0142696 A1 | 7/2004 | Saunders et al. |
| 2004/0152418 A1 | 8/2004 | Sinha et al. |
| 2004/0214539 A1* | 10/2004 | Rajamani et al. .......... 455/161.1 |
| 2005/0143027 A1 | 6/2005 | Hiddink et al. |

* cited by examiner

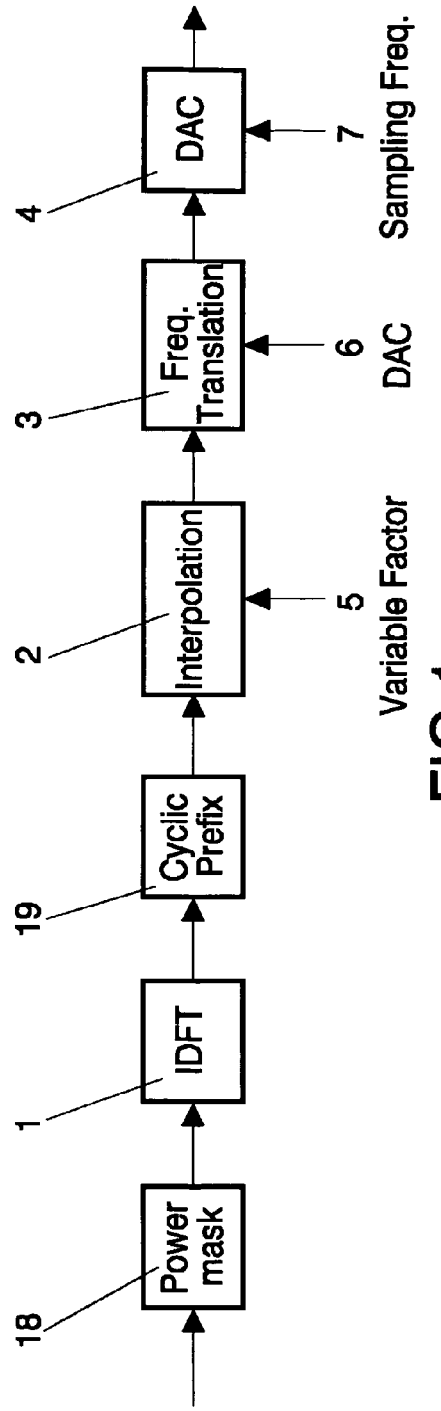
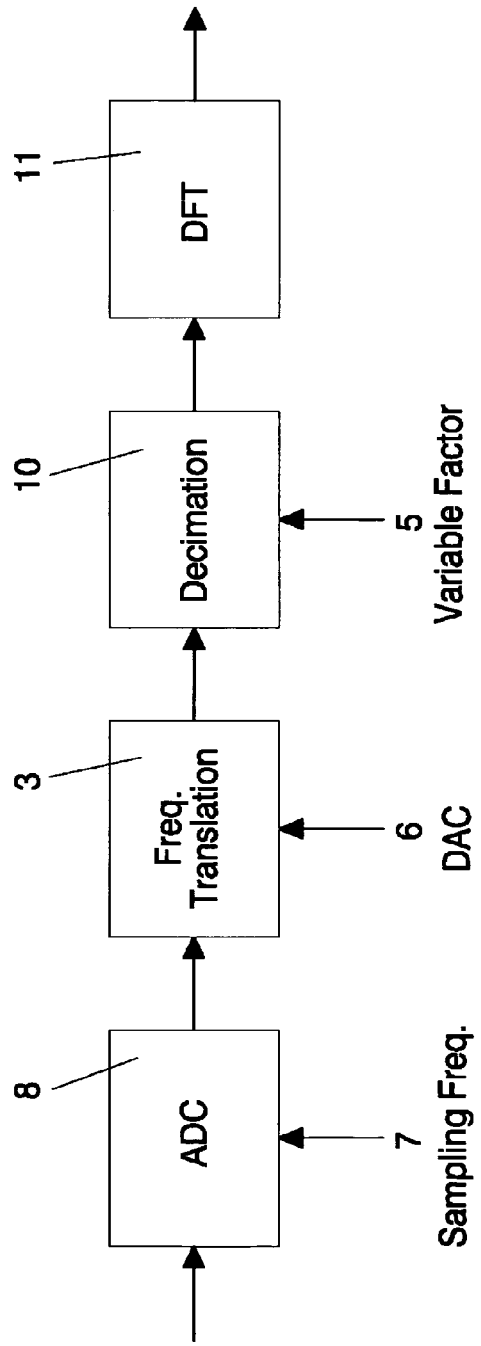
FIG.1
FIG.2

METHOD FOR THE SPECTRAL CONFIGURATION OF SIGNALS MODULATED BY MEANS OF ORTHOGONAL FREQUENCY DIVISION MULTIPLEXING (OFDM) FOR AN ELECTRICAL NETWORK

CROSS-REFERENCE TO RELATED APPLICATIONS

This application is a continuation of U.S. patent application Ser. No. 11/264,621 (now U.S. Pat. No. 8,265,176), filed on Nov. 1, 2005, which is a continuation of International Application No. PCT/ES2004/000173, filed Apr. 22, 2004, which claims the benefit of Spanish Application No. 200301022, filed May 6, 2003. The entire disclosures of the above applications are incorporated herein by reference.

FIELD

The present disclosure relates to a spectral configurability procedure for signals modulated by OFDM, which is applicable to communications systems using an electrical network as a transmission medium. With the procedure, a signal is adapted to characteristics of a channel and to regulations established by laws in force in different countries for transmission of signals via the electrical network.

BACKGROUND

In a majority of telecommunication systems it is an advantage to have means for configuring spectral characteristics of a signal, in order to be adapted to future regulations or regulations in force in different countries and to characteristics of a channel.

SUMMARY

In one implementation disclosed herein a transceiver is provided. The transceiver includes a transmitter and a receiver. The transmitter is configured to (i) receive a first orthogonal frequency division multiplexing (OFDM) signal, and (ii) generate a first analog signal based on the first OFDM signal. The first OFDM signal has a first bandwidth, a first spectral position, and a first frequency spectrum. The first frequency spectrum of the first OFDM signal has a first set of frequencies with first amplitudes. The receiver is configured to (i) receive a second analog signal, and (ii) generate a second OFDM signal based on the second analog signal. The second OFDM signal has a second bandwidth, a second spectral position, and a second frequency spectrum. The second frequency spectrum of the second OFDM signal has a second set of frequencies with second amplitudes. The transmitter is configured to vary (i) the first bandwidth, the first spectral position, and the first amplitudes independent of (ii) the second bandwidth, the second spectral position, and the second amplitudes.

There exist antecedents in the state of the art on scalable procedures of modulation for OFDM signals like that described in U.S. Pat. No. 6,175,550 "Orthogonal frequency division multiplexing system with dynamically scalable operating parameters and method thereof", in which an OFDM system is described which varies the time of the OFDM symbol or, equivalently, the bandwidth of the signal and the cyclic prefix in a dynamic way on the basis of measurements made by the receiver. The problem is that, in order to vary the symbol time, the sampling frequency of the signal in the converters is varied, which makes it necessary to vary the design of the analog components which are conventionally located after the digital-analog converter (DAC) of the transmitters and before the analog-digital converter (ADC) of the receivers. This is due to the fact that the spectral positions of the signal and of its responses depend on the sampling frequency, which means that the necessary filtering characteristics are different as that frequency varies. A procedure disclosed herein solves this problem and manages to get the variation in the duration of the OFDM symbol to be done without varying the design of the analog components, since the frequency of the converters is not varied.

In order to achieve the objectives and avoid the drawbacks stated above, a spectral configurability procedure is provided for signals modulated by OFDM for the electrical network, which includes the sending and reception of signals by means of OFDM modulation via the electrical network. The procedure is characterized by the fact that the bandwidth and the spectral position of the OFDM signal, the shape and level of the spectrum of the OFDM signal that is transmitted, or any combination of these, are varied independently for the transmission path and for the reception path. All these parameters are changed without varying the sampling frequency of the digital-analog converter of the transmitter and the analog-digital converter of the receiver. In this way, the communications system can be adapted to the regulations of each country both in the range of frequencies and in the injected or radiated power, and to the type of channel.

The variation in the bandwidth of the signal in transmission is done by means of an interpolation with a configurable interpolation factor which is a function of the required variation, and in reception it is done by means of decimating with a factor that is likewise configurable.

In order to locate the spectrum of the signal in the desired position, the procedure carries out a digital band translation with a variable frequency, whose value is a function of the desired position.

The procedure provides for the use of a power mask in order to select the level of the signal of each carrier (carrier to carrier), which permits the attenuation of the channel to be precompensated and the carriers to be eliminated, which in turn narrows the bandwidth of the signal and creates gaps in the signal spectrum, achieving the shape and level desired for that spectrum in accordance with the requirements set down in each country.

In order to attenuate the side lobes of the signal and achieve more abrupt spectral gaps, the OFDM symbols in the time domain are multiplied by an elevation cosine window.

The procedure enables a communication system to be obtained via the electrical network in which the communication is done with spectra independent of the OFDM signal for transmission and reception in terms of bandwidth, spectral location, shape and level of the signal.

It is also possible for various independent systems using different bandwidths, spectral location, shape and size of the signal to communicate with equipment simultaneously following their same communication system, sharing the channel by means of frequency division multiplexing.

Finally, it is also possible to vary the duration of the cyclic prefix which conventionally precedes each symbol of the OFDM signal, in such a way that the system can be adapted to the type of channel.

With all this, the communication systems via the electrical network are successfully adapted to the norms and regulations of the different countries and to the different types and topologies of channel, without variations in the physical implementation of the system.

Below, in order to facilitate a better understanding of this specification and forming an integral part thereof, figures are included in a manner that is illustrative rather than limiting.

BRIEF DESCRIPTION OF DRAWINGS

The present disclosure will become more fully understood from the detailed description and the accompanying drawings, where:

FIG. 1 represents a block diagram of a transmitter functioning in accordance with the present disclosure;

FIG. 2 represents a block diagram of a receiver functioning in accordance with the present disclosure;

DESCRIPTION

Figure 3:
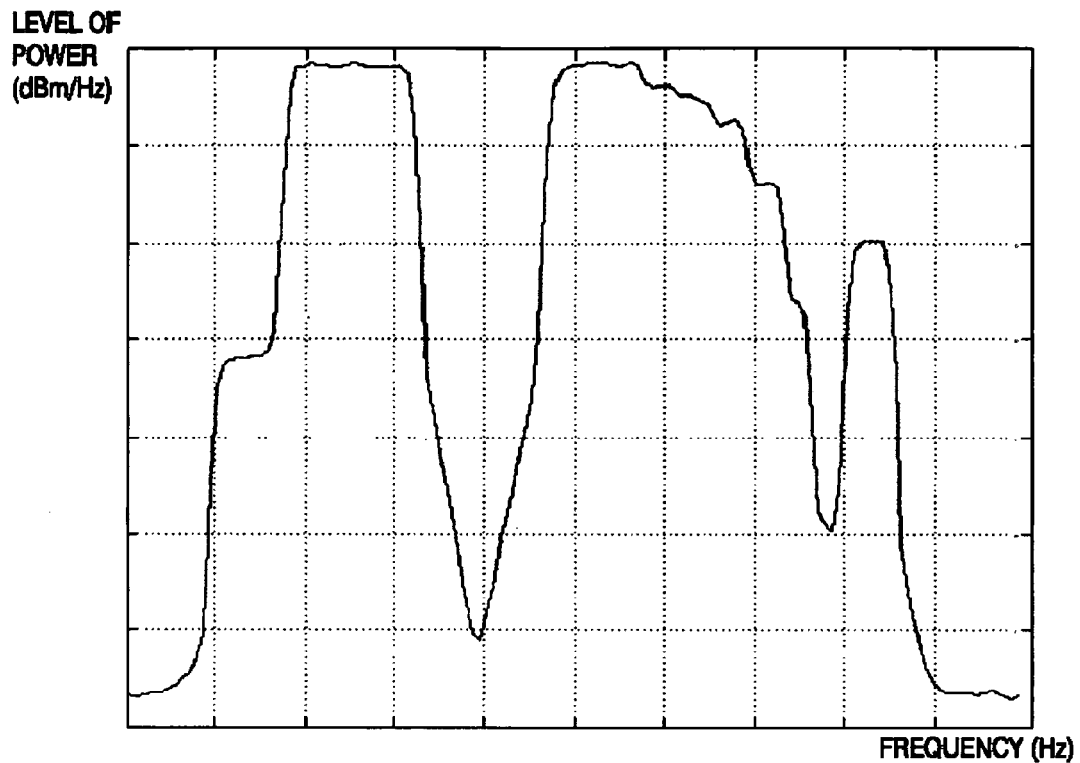
FIG. 3 represents the power spectral density (PSD) of the transmitted signal.

When designing communications systems via the electrical network, we are faced with a lack of common norms on the frequency ranges that can be used for each service and the power spectral density that can be injected into the line. These norms change from one country to another, and there are even cases in which they have not yet been defined. In other cases, it is necessary to design a system that is adapted to different scenarios of use, such as access, local area network or transport or trunk network, in which the needs are also different. In order to solve all these problems, a procedure is provided and includes a method for being able to adapt the characteristics of the signal of a transmission system via the electrical network to each specific case, varying solely the digital parameters of configuration, in other words, with a same physical implementation of the system.

The present procedure enables the bandwidth and the position of the OFDM signal to be varied independently for transmission and reception, along with the shape and level of the signal spectrum and the cyclic prefix of the OFDM signal in transmission.

In order to carry out this process in transmission a block diagram is used like that shown in FIG. 1, in which a block (18) is observed which applies the power mask on the signal, after which appears a block (1) which performs the inverse Fourier transform (IDFT), which is conventionally used for carrying out OFDM modulation, and a block (19) which inserts the cyclic prefix and multiplies the signal by an elevation cosine window. At the output from this block, an interpolation (2) is carried out of the signal with a variable factor (5) in order to vary the bandwidth. As the procedure does not affect the sampling frequency (7) of the digital-analog converter (DAC) (4), in other words it stays fixed, the larger the interpolation factor (5) the greater the number of samples per symbol, which means that the symbol time is greater and the bandwidth occupied by the signal is less, and vice versa, with a smaller interpolation factor a larger bandwidth is obtained. In order to carry out this interpolation by a variable factor, various interpolators of different factors can be used, which, moreover, can be combined together to obtain other factors. Once the signal with the desired bandwidth has been obtained, it needs to be located in the appropriate spectral position. To achieve this, a translation is carried out in the digital band by means of the block (3) which has a variable translation frequency (6) for carrying out the required translation. After that, the digital signal is converted to analog signal by means of a converter (4) of fixed frequency (7).

In reception, the process is carried out in reverse. The OFDM analog signal is received and converted into a digital signal by means of an analog-digital converter (8) which, in this example implementation, samples the signal at the same fixed frequency (7) used in the transmitter. After that, the band translation is carried out in order to pass the signal received in bandpass to baseband by means of the block (3) with a translation frequency which, in this example implementation, coincides with the translation frequency (6) used in transmission. Afterwards, the signal is decimated (10) by a variable factor, which in this example implementation coincides with the interpolation factor used in transmission (5), whose value is selected in such a way that the same number of samples for each symbol arrives at the block (11) that is performing the Fourier transform (DFT).

In this entire process the transmission and reception parameters in the same node do not need to be equal.

In order to configure the power level or power spectral density of the signal to transmit, one power mask per carrier is used, which in FIG. 1 is applied in the block (18), in other words, before passing the signal to the time domain with the block (1). In other words, when the OFDM symbol is generated in frequency, each carrier is multiplied by a value which determines the power of that carrier. As that power is relative to the other carriers, since it will be the analog components that determine the final power of the signal, this value stands between zero and one, where zero corresponds to eliminating the carrier and one corresponds to the maximum power, with those values or any other intermediate value being able to be used.

In some cases, it might be of interest to eliminate certain carriers in order to generate gaps in the spectrum. These gaps can be necessary for not interfering with other communication services using the same frequencies, such as amateur radio enthusiasts, for example. It can also be stated that the frequencies of these gaps vary in different countries. Carriers can also be eliminated from the ends of the bands in order to reduce the bandwidth of the signal. The intermediate values of the power mask can be used for compensating the effects of the channel. The majority of channels attenuate high frequencies more so than lower ones. The power mask can be used to give more power to high carriers in such a way that all the carriers arrive at the receiver with a similar power. A spectrum generated with an arbitrary shape is illustrated in FIG. 3, in which the different levels of power injected for each frequency can be seen.

Figure 4:
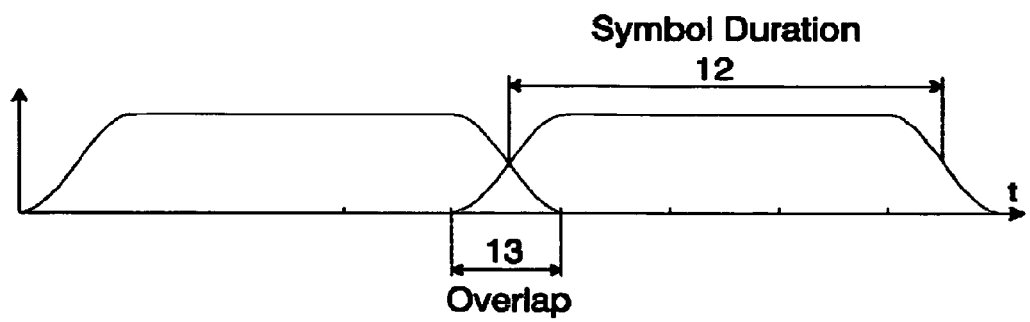
FIG. 4 represents the windows in elevation cosine used in two consecutive symbols.

The elimination of carriers within the band does not imply that the power injected at those frequencies is zero, since there exists power due to the side lobes of the adjacent carriers. These side lobes appear due to the transitions between the symbols of the OFDM signal and, in order to reduce them, each OFDM symbol in the time domain can be multiplied by an elevation cosine window, which in FIG. 1 is carried out by the block (19), which inserts the cyclic prefix in a configurable way and multiplies the signal to be transmitted by an elevation cosine window. FIG. 4 shows the shape of that window for two consecutive symbols. The effective duration of a symbol is a time (12) and it can be seen that there is a certain overlap (13) between symbols. In this way, by applying the elevation cosine window, a smaller number of carriers need to be eliminated in order to achieve a particular depth of gap in the spectrum.

Figure 5:
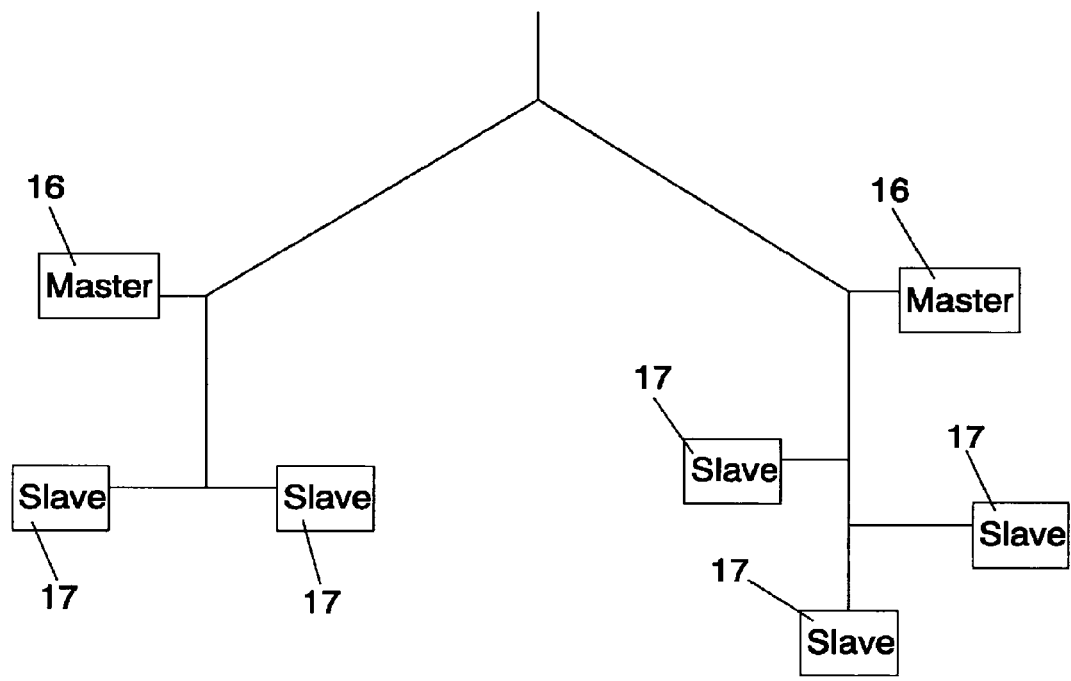
FIG. 5 represents two sets of nodes using frequency division multiplexing with different parameters in transmission and reception.

The procedure permits a node to be had which transmits using certain frequencies and receives via others. Obviously, any node wishing to communicate with this one will have to function with the transmission and reception frequencies inverted with respect to the first node. This is an advantage in a tree-type channel topology like that shown in FIG. 5, which is common in the low-tension electrical network, in which all the nodes hanging from a single branch communicate with the base of that branch. If it is required to provide a service in two branches of the tree, this can be done by locating a node (16) in the base of each of the branches. These nodes transmit in one range of frequencies and receive in another, in such a way that they cannot communicate with each other, but nor can they interfere with each other. In each of the branches, other nodes (17) hang which communicate with their master (16). The transmission of a slave (17) will be received by its master and will be received by the other master where it will arrive more attenuated due to being a greater distance away in terms of the length of electric cable. If this attenuation is sufficient, the transmission of the slave node will not affect the reception of the other master, so that the two groups of nodes can share the channel without interference between them.

Another possible configuration is for several nodes to communicate using certain frequencies and another group of nodes to use other different frequencies, in such a way that there is no communication or interference between the two groups of nodes.

In the majority of OFDM systems, the use of a cyclic prefix is known, consisting of repeating the last samples of the symbol at the beginning of it. This is done in order to prevent inter-symbol interference (ISI) caused by delay-spread of the channel, for which the length of the cyclic prefix has to be greater than that delay-spread. It is evident that each channel will have its own delay-spread, so it is normal to use a cyclic prefix that is sufficiently large for the majority of channels. Depending on the application of the system, different types of channel can be found, such as medium or low tension channels, access channels or in home channels, which statistically present different delay-spreads.

Typically, in the electrical network, the delay-spread is less in the medium tension lines and in connections within the same home than in the access sections. Because of all this, it is an advantage to have a system in which the duration of the cyclic prefix can be varied and thereby be able to exploit the characteristics of each channel better. Therefore, the procedure provides that this modification can be done by using the block (19) for inserting the cyclic prefix in a configurable way and multiplying the signal by an elevation cosine window.

What is claimed is:

1. A transceiver comprising:
    a transmitter configured to (i) receive a first orthogonal frequency division multiplexing signal, and (ii) generate a first analog signal based on the first orthogonal frequency division multiplexing signal, wherein the first orthogonal frequency division multiplexing; signal has a first bandwidth, a first spectral position, and a first frequency spectrum, and wherein the first frequency spectrum of the first orthogonal frequency division multiplexing signal has a first set of frequencies with first amplitudes;
    a receiver configured to (i) receive a second analog signal, and (ii) generate a second orthogonal frequency division multiplexing signal based on the second analog signal, wherein the second orthogonal frequency division multiplexing signal has a second bandwidth, a second spectral position, and a second frequency spectrum, wherein the second frequency spectrum of the second orthogonal frequency division multiplexing signal has a second set of frequencies with second amplitudes,
    wherein the transmitter is configured to vary (i) the first bandwidth, the first spectral position, and the first amplitudes independent of (ii) the second bandwidth, the second spectral position, and the second amplitudes, and
    wherein the transmitter comprises:
        a first device configured to apply a first power mask to the first orthogonal frequency division multiplexing signal to generate a first carrier signal, wherein the applying of the first power mask includes adjusting (i) the first amplitudes of the first frequency spectrum of the first orthogonal frequency division multiplexing signal, and (ii) power levels of frequency carriers of the first orthogonal frequency division multiplexing signal,
        a second device configured to apply an inverse fast Fourier transform to the first carrier signal to generate a first time-domain signal,
        a multiplier configured to multiply the first time-domain signal by at least one cosine window to generate a second time-domain signal, and
        a translator configured to translate the second time-domain signal to a first digital signal; and
        an interpolator configured to adjust a bandwidth of the second time-domain signal by interpolating the second time-domain signal based on a factor to generate an interpolated signal;
        wherein the translator is configured to adjust a spectral position of the interpolated signal to generate the first digital signal, and
        wherein the interpolator is configured to (i) decrease the factor to increase the first bandwidth for the first orthogonal frequency division multiplexing signal, and (ii) increase the factor to decrease the first bandwidth for the first orthogonal frequency division multiplexing signal.

2. The transceiver of claim 1, wherein the receiver is configured to vary (i) the second bandwidth, the second spectral position, and the second amplitudes independent of (ii) the first bandwidth, the first spectral position, and the first amplitudes.

3. The transceiver of claim 1, wherein:
    the transmitter comprises an digital-to-analog converter;
    the digital-to-analog converter is configured to generate the first analog signal based on a first sampling frequency; and
    the transmitter is configured to vary the first bandwidth, the first spectral position, and the first amplitudes without varying the first sampling frequency.

4. The transceiver of claim 1, wherein:
    the receiver comprises an analog-to-digital converter;
    the analog-to-digital converter is configured to (i) receive the second analog signal, and (ii) convert the second analog signal to a second digital signal based on a second sampling frequency; and
    the receiver is configured to vary the second bandwidth, the second spectral position, and the second amplitudes without varying the second sampling frequency.

5. The transceiver of claim 1, wherein the transmitter is configured to:
    set the first bandwidth, the first spectral position, and the first amplitudes to satisfy a first regulation of a first country;
    transmit the first analog signal having the first bandwidth, the first spectral position, and the first amplitudes;
    receive a third orthogonal frequency division multiplexing signal;

set a third bandwidth, a third spectral position, and third amplitudes of a third frequency spectrum to satisfy a second regulation of a second country;

generate a third analog signal based on the third orthogonal frequency division multiplexing signal, the third bandwidth, the third spectral position, and the third amplitudes; and transmit the third analog signal having the third bandwidth, the third spectral position, and the third amplitudes.

6. The transceiver of claim 5, wherein:

the transmitter comprises a digital-to-analog converter;

the digital-to-analog converter is configured to sample the first digital signal at a first sampling frequency to generate the first analog signal;

the first digital signal is generated based on the first orthogonal frequency division multiplexing signal;

the digital-to-analog converter is configured to sample a second digital signal at the first sampling frequency to generate the third analog signal; and the second digital signal is generated based on the third orthogonal frequency division multiplexing signal received by the transmitter.

7. The transceiver of claim 5, wherein:

the first regulation comprises, for analog signals transmitted in the first country, a first range of frequencies, a first injected power level, and a first radiated power level; and the second regulation comprises, for analog signals transmitted in the second country, a second range of frequencies, a second injected power level, and a second radiated power level.

8. The transceiver of claim 1, wherein the transmitter is configured to:

convert the first digital signal to the first analog signal based on a first sampling frequency, wherein the first digital signal is generated based on the first orthogonal frequency division multiplexing signal;

receive a third orthogonal frequency division multiplexing signal;

adjust parameters of the third orthogonal frequency division multiplexing signal to generate a third analog signal, wherein the parameters include a third bandwidth, a third spectral position, and third amplitudes of a third frequency spectrum; and convert a second digital signal to the third analog signal based on the first sampling frequency, wherein the second digital signal is generated based on the third orthogonal frequency division multiplexing signal, and wherein the second digital signal is converted to the third analog signal without altering the first sampling frequency used to convert the first digital signal to the first analog signal.

9. The transceiver of claim 1, wherein the multiplier is configured to (i) adjust a duration of a first cyclic prefix based on a delay spread of a channel of the first orthogonal frequency division multiplexing signal, and (ii) insert the first cyclic prefix in the first time-domain signal.

10. The transceiver of claim 9, wherein: the translator is configured to adjust a spectral position of the interpolated signal to generate the first digital signal; and the adjusting of the spectral position of the interpolated signal comprises baseband-to-bandpass converting the interpolated signal based on a predetermined frequency.

11. The transceiver of claim 9, wherein the first device, when applying the first power mask, is configured to:

introduce frequency gaps in the first frequency spectrum of the first orthogonal frequency division multiplexing signal; and narrow a bandwidth of the first orthogonal frequency division multiplexing signal.

12. The transceiver of claim 11, wherein the multiplier, when multiplying the first time-domain signal by the at least one cosine window, is configured to:

multiply each symbol of the first time-domain signal by a respective cosine window;

adjust the frequency gaps of the first frequency spectrum of the first orthogonal frequency division multiplexing signal; and reduce side lobes of the first frequency spectrum of the first orthogonal frequency division multiplexing signal.

13. The transceiver of claim 9, wherein:

the first device is configured to (i) apply the first power mask to the first orthogonal frequency division multiplexing signal according to a first regulation associated with a first country, (ii) receive a third orthogonal frequency division multiplexing signal, and (iii) apply a second power mask to the third orthogonal frequency division multiplexing signal to generate a second carrier signal according to a second regulation, wherein the second regulation is associated with a second country;

the translator is configured to generate a second digital signal based on the second carrier signal; and the digital-to-analog converter is configured to convert the second digital signal to a third analog signal.

14. The transceiver of claim 13, wherein:

the first device, when applying the second power mask, is configured to adjust (i) third amplitudes of a third frequency spectrum of the third orthogonal frequency division multiplexing signal, and (ii) power levels of frequency carriers of the third orthogonal frequency division multiplexing signal;

the first amplitudes of the first frequency spectrum are different than the third amplitudes of the third frequency spectrum; and the power levels of the frequency carriers of the first orthogonal frequency division multiplexing signal are different than the power levels of the frequency carriers of the third orthogonal frequency division multiplexing signal.

15. The transceiver of claim 13, wherein:

the multiplier is configured to (i) generate a third time-domain signal based on the second carrier signal, (ii) insert the first cyclic prefix in the first time-domain signal based on a first channel type, and (iii) based on a second channel type, insert a second cyclic prefix in the third time-domain signal to generate a fourth time-domain signal; and the translator is configured to generate the second digital signal based on the fourth time-domain signal.

16. The transceiver of claim 15, the translator is configured to adjust a spectral position of the interpolated signal to generate the first digital signal including baseband-to-bandpass converting the interpolated signal based on a first predetermined frequency;

the second device is configured to apply an inverse fast Fourier transform to the second carrier signal to generate the third time-domain signal;

the multiplier is configured to multiply the third time-domain signal by at least one cosine window to generate the fourth time-domain signal;

the interpolator is configured to adjust a bandwidth of the fourth time-domain signal by interpolating the third time-domain signal based on a second factor to generate a second interpolated signal; and the translator is configured to adjust a spectral position of the second interpolated signal to generate the second digital signal including baseband-to-bandpass converting the second interpolated signal based on a second predetermined frequency.

17. The transceiver of claim 13, wherein the transmitter is configured to:

adjust a duration of a second cyclic prefix based on a delay spread of a channel of the third orthogonal frequency division multiplexing signal; and insert the second cyclic prefix in the second time-domain signal.

18. The transceiver of claim 17, wherein the channel of the first orthogonal frequency division multiplexing signal is different than the channel of the third orthogonal frequency division multiplexing signal.

19. The transceiver of claim 1, wherein the receiver comprises:

an analog-to-digital converter configured to, based on a second sampling frequency, convert the second analog signal to a second digital signal;

a converter configured to, based on a predetermined frequency, bandpass-to-baseband convert the second digital signal to a baseband signal;

a third device configured to, based on a factor, decimate the baseband signal to generate a decimated signal; and a fourth device configured to fast Fourier transform the decimated signal to generate the second orthogonal frequency division multiplexing signal.

\* \* \* \* \*